United States Patent
Loyer

[11] Patent Number: 5,999,794
[45] Date of Patent: Dec. 7, 1999

[54] TELEVISION RECEIVER-DECODER FOR RECEIVING SIGNALS FROM AND FOR SUPPLYING POWER TO A SATELLITE CONVERTER

[75] Inventor: Philippe Loyer, Paris, France

[73] Assignee: U.S. Philips Corporation, New York, N.Y.

[21] Appl. No.: 08/914,056

[22] Filed: Jul. 15, 1997

[30] Foreign Application Priority Data

Aug. 13, 1996 [FR] France ................................ 96 10150

[51] Int. Cl.⁶ ....................................... H04N 7/20
[52] U.S. Cl. ............................ 455/3.2; 455/3.3; 348/731
[58] Field of Search .......................... 348/6, 7, 10, 12, 348/731; 455/3.2, 3.3

[56] References Cited

U.S. PATENT DOCUMENTS 5,134,486  7/1992  Suzuki et al. .......................... 358/190

FOREIGN PATENT DOCUMENTS

0505038A1  9/1992  European Pat. Off. .

OTHER PUBLICATIONS

"Multi–User Satellite TV Reception", P. Schrama, Elektor Electronics, vol. 19, No. 208, 1 fevrier 1993, London.

"Kaskadier–fähiger Multiswitch", K. Schmedt et al., Radio Fernsehen Elektronik, vol. 43, No. 3, 1 mars 1994, pp. 22/23.

*Primary Examiner*—Nathan Flynn
*Attorney, Agent, or Firm*—Edward W. Goodman

[57] ABSTRACT

For supplying a power supply voltage to a Low Noise block with a plurality of different receiver-decoders connected to the same Low Noise block by a cable which transmits an intermediate-frequency signal as well as a power supply voltage intended for the Low Noise block, the receiver-decoders are connected in cascade and the upstream receiver-decoder (5) includes a transfer module (23) which transmits the intermediate-frequency signal of a connector (8) for connection to the Low Noise block to a connector (9) for connection to a downstream receiver-decoder when the upstream receiver-decoder is inoperative, and supplies a power supply voltage between the same connectors in the other direction.

8 Claims, 2 Drawing Sheets

TELEVISION RECEIVER-DECODER FOR RECEIVING SIGNALS FROM AND FOR SUPPLYING POWER TO A SATELLITE CONVERTER

BACKGROUND OF THE INVENTION

1. Field of the Invention

The invention relates to a method of supplying a power supply voltage to satellite converter block, named "Low Noise Block", during use of a plurality of different receiver-decoders connected to the same Low Noise block by means of a main cable for transmitting an intermediate-frequency signal from the Low Noise block and for supplying a power supply voltage and possibly a low-frequency control voltage to the Low Noise block.

The invention also relates to a television receiver-decoder and to a transfer module, in which units the method is carried into effect.

2. Description of the Related Art

A satellite reception unit comprises a parabolic antenna which concentrates a signal in the range of 12 GHz onto a Low Noise block which converts the signal into an intermediate-frequency signal in the range of 1 GHz, and this signal is transmitted through a cable to a receiver-decoder which selects a channel and demodulates it for generating a video and an audio signal supplied, for example, to a conventional television set. The Low Noise block does not have its own supply but is fed via the cable by a power supply in the receiver-decoder. A problem occurs when one and the same Low Noise block is connected to several receiver-decoders because this presents the risk of conflict between the power supply voltages transmitted through the same cable by several receiver-decoders, and, moreover, it is necessary to split the signal among the different receiver-decoders. A solution to this problem is known from U.S. Pat. No. 5,134,486. In accordance with this patent, each receiver-decoder comprises a switch allowing supply or no supply through the cable, and a distributor module splits the signal among different receiver-decoders. The user must activate the switches himself.

SUMMARY OF THE INVENTION

It is an object of the invention to obtain an operation which is transparent to a user, i.e., the user does not need to intervene by activating switches.

To this end, the receiver-decoders are connected in cascade and, each time, connected to each other by means of a connection cable, and at least the receiver-decoder which is directly connected to the Low Noise block provides a contact between the main cable and the connection cable for intermediate-frequency signals and, when it is inoperative, provides a contact between the connection cable and the main cable for low frequencies so as to supply a power supply voltage and possibly a control voltage.

A television receiver-decoder according to the invention comprises connection means for connection to another receiver-decoder, and a transfer module which comprises detector means for detecting when the receiver-decoder is inoperative, and for activating the transfer means for supplying a power supply voltage and possibly a control voltage from the other receiver-decoder to the main cable.

A transfer module according to the invention is provided with means for supplying a power supply voltage and possibly a control voltage to the cable from one of a plurality of receiver-decoders.

The transfer means comprises a switch in series with at least an inductance, the switch being activated by the presence or absence of a power supply voltage of the receiver-decoder, or by a microprocessor managing the receiver-decoder functions.

Advantageously, a receiver-decoder also comprises means for transmitting an intermediate-frequency signal from the main cable to the other receiver.

The means for transmitting an intermediate-frequency signal comprises a splitter amplifier fed by a permanent power supply or fed, as a function of information given by the detector means, either from the power supply of the receiver-decoder itself or from the other receiver.

BRIEF DESCRIPTION OF THE DRAWINGS

These and other aspects of the invention are apparent from and will be elucidated with reference to the embodiments described hereinafter, by way of non-limitative example, In the drawings.

DESCRIPTION OF THE PREFERRED EMBODIMENTS

Figure 1:
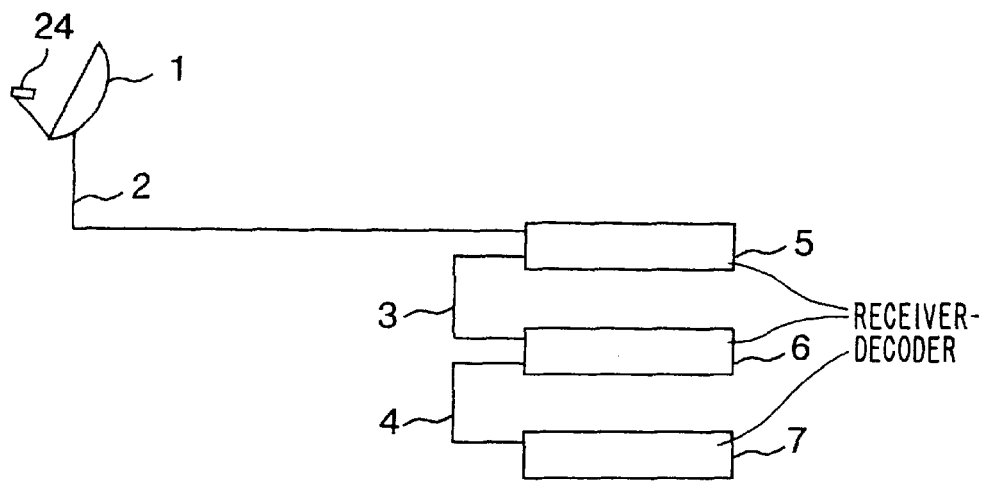
FIG. 1 shows, diagrammatically, a reception system comprising three receiver-decoders.

The system shown in FIG. 1 comprises a parabolic antenna 1 which concentrates a signal in the range of 12 GHz onto a Low Noise block 24. This Low Noise block 24 converts the signal into an intermediate-frequency signal in the 1 GHz band, which is transmitted through a main cable 2 to a receiver-decoder 5 which selects a channel and demodulates it for generating a video and an audio signal supplied, for example, to a conventional television set (not shown).

In this embodiment, three different receiver-decoders 5, 6, 7 are connected in cascade and connected to the same Low Noise block 24 by means of the main cable 2 which transmits the IF signal and a power supply voltage and a control voltage intended for the Low Noise block. The receiver-decoders 5 and 6 are interconnected by means of a cable 3, and the receiver-decoders 6 and 7 are interconnected by means of a cable 4. The receiver-decoder 5 includes a transfer module which transmits the IF signal from the main cable 2 to cable 3 and, when the receiver-decoder 5 is inoperative, transmits a power supply voltage and a control voltage from cable 3 to the main cable 2. The receiver-decoder 6 also includes a transfer module which transmits the IF signals from cable 3 to cable 4 and, when the receiver-decoder 6 is inoperative, transmits a power supply voltage and a control voltage from cable 4 to cable 3.

Figure 2:
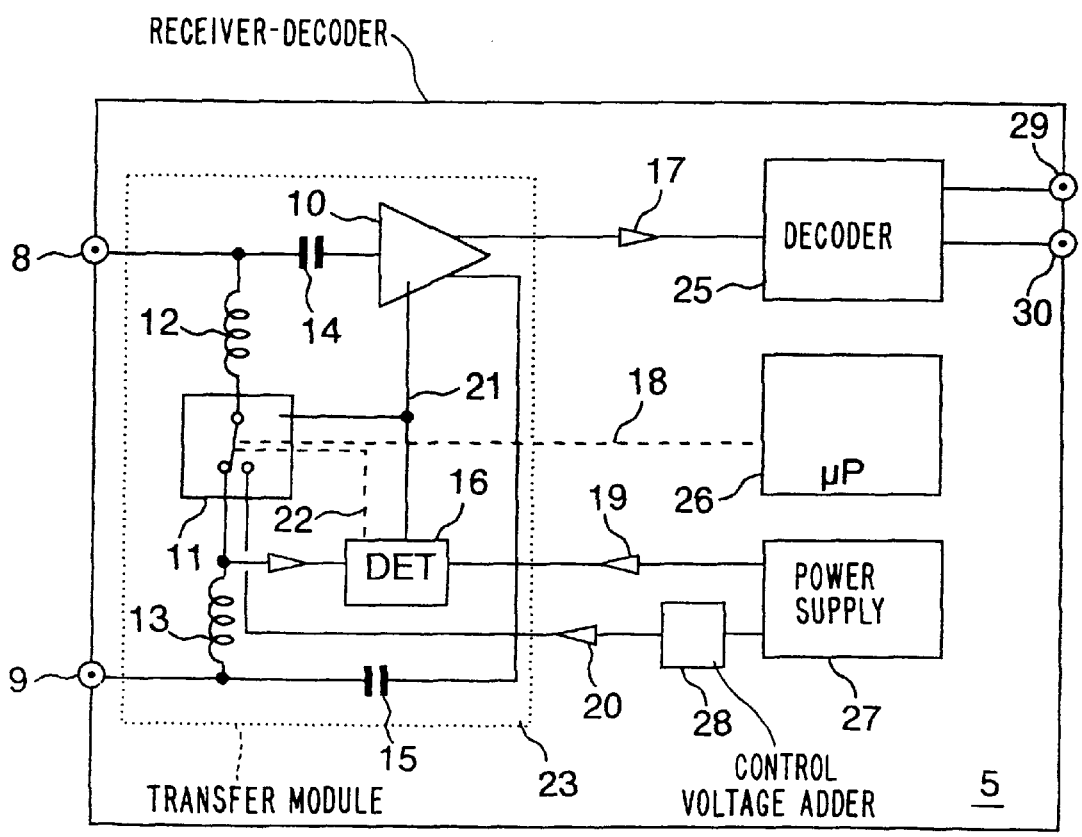
FIG. 2 is a diagrammatic example of a transfer module in a receiver-decoders.

A transfer module 23, for example, the module of receiver-decoder 5, is shown in FIG. 2. It is provided with means for transmitting the IF signal from a connector 8, here connected to the main cable, to the receiver-decoder 5 by means of a connection 17, and to a connector 9, here connected to the connection cable 3 with the receiver-decoder 6. The module 23 is also provided with transfer means for transmitting a power supply voltage and a control voltage to the connector 8, either from the connector 9, here connected to the receiver-decoder 6, or from the receiver-decoder 5 itself.

The means for transmitting the IF signal are constituted, between the connectors 8 and 9, by a coupling capacitor 14 connected to the input of a distributor amplifier 10, or an amplifier followed by a distributor which has two outputs, one of which is connected to the connector 9 via a capacitor 15. The other output of the amplifier 10 is connected via connection 17 to a known decoding module 25 which supplies a video and an audio signal at connectors 29 and 30. As a variant, instead of being split and supplied permanently both to the decoding module 25 and to the connector 9, the IF signal at the connector 8 may be alternatively transmitted via a switch, either to the decoding module 25 or to the connector 9.

The transfer means for transmitting a power supply voltage and a control voltage are constituted, between the connectors 9 and 8, by an inductance 13 connected to a terminal of a switch 11 having two positions and the common terminal of the switch 11 connected to an inductance 12. In the position shown in the Figure, the common terminal is connected to the inductance 13. A voltage from a known power supply 27 is applied to the other terminal of the switch by means of a connection 20. A module 28 arranged in the connection 20 is capable of adding, in known manner, a low-frequency control voltage of, for example, 22 kHz, which may be of the so called DiSEqC type. The inductances are used for blocking the high frequencies of the IF signal, but have such a value that they pass the control voltages.

A circuit 16 for detecting the presence and origin of a power supply voltage controls the switch 11 by means of a control signal denoted by the reference numeral 22: if a power supply voltage from the power supply 27 is present at the connector 9 and absent at a connection 19, the switch 11 is set to the position shown in the Figure, and in the inverse case, the other position is selected. The circuit 16 also transmits a power supply voltage from either the connection 19 or the connector 9 via the inductance 13 to the amplifier 10 and possibly to the switch 11. When the receiver-decoder 5 is inoperative and when the voltage at 19 is absent, the power supply voltage at the connector 9 is used for feeding the amplifier 10. If voltages are present both at the connection 19 and the connector 9, one of the two positions is taken, dependent on a choice made a priori and being relatively arbitrary. Alternatively, the amplifier 10 may be fed by a sub-assembly of the power supply 27 continuing to supply a voltage when the receiver-decoder 5 is in a standby state.

The switch 11 may also be controlled by means of a control signal denoted by the reference numeral 18 and coming from a microprocessor 26 of the receiver-decoder 5, which switch is then controlled by means of general software for managing the receiver-decoder functions. For example, the reception of an instruction from a remote control unit and putting the receiver-decoder in a standby state may trigger the switch 11 in the position shown in the Figure.

The receiver-decoder 6 shown in FIG. 1 also comprises an identical transfer module for transmitting the IF signal from the cable 3 to the cable 4 and the receiver-decoder 7, and for transmitting a power supply voltage and a control voltage from the cable 4 and the receiver-decoder 7 to the cable 3.

Figure 3:
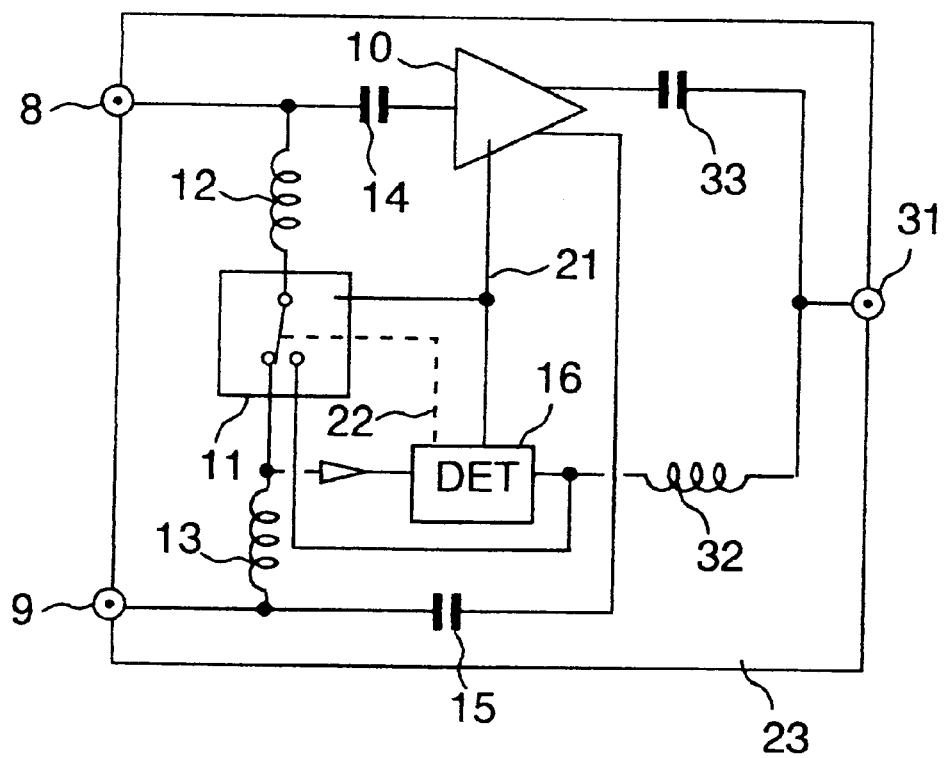
FIG. 3 is a diagrammatic example of an independent transfer module.

Instead of being integrated in a receiver-decoder, a transfer module may also be provided separately for allowing users to use several receiver-decoders connected to the same Low Noise block, which receiver-decoders do not comprise such a module and each have a single connector provided for a direct connection with a Low Noise block. Such a separate module, shown in FIG. 3, comprises elements which are similar to those in FIG. 2 and have the same reference numerals. It comprises connectors 8 and 9 and also a connector 31 for connection with the connector of a receiver-decoder. The amplifier 10 has an output which is connected via a capacitor 33 to the connector 31 and the latter is connected via an inductance 32 to the terminal of the switch which was connected to the connection 20 in FIG. 2, and to one of the inputs of the detection circuit 16. Supposing that the receiver-decoders are not provided with a transfer module and have only one connector, the system of FIG. 1 will now be considered. A first transfer module would then have, for example its connector 8 connected to the Low Noise block 24, its connector 31 connected to the receiver-decoder 5 and its connector 9 connected to the connector 8 of a second transfer module whose connector 9 would be connected to the receiver-decoder 7 and the connector 31 would be connected to the receiver-decoder 6.

What is claimed is:

1. A method of supplying a power supply voltage to a satellite converter during use of a plurality of different receiver-decoders connected to the same satellite converter by means of a main cable for transmitting an intermediate-frequency signal from the satellite converter and for supplying a power supply voltage to the satellite converter, characterized in that the method comprises the steps:

connecting the receiver-decoders in cascade using connection cables wherein one of said receiver-decoders is connected to said main cable;

transferring, at least in said one receiver-decoder, said intermediate frequency signal to down-stream receiver-decoders;

transmitting a power supply voltage up-stream to said satellite converter and blocking a power supply voltage from said down-stream receiver-decoders when said one receiver-decoder is active; and transferring the power supply voltage from said down-stream receiver-decoders when said one receiver-decoder is inactive.

2. A transfer module for use in a receiver-decoder allowing use of a plurality of other receiver-decoders with one and the same satellite converter by means of a cable for transmitting an intermediate-frequency signal from the satellite converter and for supplying a power supply voltage to the satellite converter, characterized in that said transfer module comprises:

means for detecting whether said receiver-decoder is active;

means for supplying said power supply voltage to the cable from said receiver-decoder when said receiver decoder is active; and means for transferring said power supply voltage from one of said other receiver-decoders to the cable when said receiver decoder is inactive.

3. A television receiver-decoder for connection to a satellite converter by a main cable for transmitting an intermediate frequency signal from the satellite converter and for conducting a power supply voltage to the satellite converter, said television receiver-decoder comprising:

first connection means for connecting said television receiver-decoder to said main cable;

second connection means for connecting said television receiver-decoder to a down-stream receiver-decoder via a connection cable;

means for supplying a power supply voltage to said first connection means; and a transfer module, wherein said transfer module comprises:

means for detecting when said television receiver-decoder is inactive; and transfer means for transferring a power supply voltage from said second connection means to said first connection means when said detecting means detects that said television receiver-decoder is inactive.

4. A television receiver-decoder as claimed in claim 3, characterized in that the transfer means comprises a controllable switch in series with at least an inductance, the controllable switch being activated by said detecting means, said detecting means detecting the presence or absence of said power supply voltage of the television receiver-decoder.

5. A television receiver-decoder as claimed in claim 3, characterized in that the transfer means comprises a controllable switch in series with at least an inductance, and said detecting means comprising a microprocessor for managing the receiver-decoder functions.

6. A television receiver-decoder as claimed in claim 3, characterized in that said television receiver-decoder also comprises means for transmitting an intermediate-frequency signal from the first connection means to the second connection means.

7. A receiver-decoder as claimed in claim 6, characterized in that the means for transmitting an intermediate-frequency signal comprises a splitter amplifier fed by a permanent power supply.

8. A receiver-decoder as claimed in claim 6, characterized in that the means for transmitting an intermediate-frequency signal comprises a distributor amplifier fed, as a function of information given by the detecting means, either from the power supply means of the television receiver-decoder or from the power supply voltage at the second connection means.

\* \* \* \* \*